A. P. CRELL.
TIRE CARRIER.
APPLICATION FILED DEC. 9, 1918.

1,331,244.

Patented Feb. 17, 1920.

Inventor.
Albert P. Crell,
By
Attorney

UNITED STATES PATENT OFFICE.

ALBERT P. CRELL, OF GRAND RAPIDS, MICHIGAN, ASSIGNOR TO NEW ERA SPRING & SPECIALTY COMPANY, OF GRAND RAPIDS, MICHIGAN, A CORPORATION OF MICHIGAN.

TIRE-CARRIER.

1,331,244.   Specification of Letters Patent.   Patented Feb. 17, 1920.

Application filed December 9, 1918. Serial No. 265,994.

*To all whom it may concern:*

Be it known that I, ALBERT P. CRELL, a citizen of the United States, residing at Grand Rapids, in the county of Kent and State of Michigan, have invented certain new and useful Improvements in Tire-Carriers, of which the following is a specification.

My invention relates to improvements in tire carriers for storing and carrying demountable and surplus rims and tires upon automobiles and other tire using vehicles, and its objects are: first, to provide a tire carrier with which a demountable tire carrying rim may be clamped in the carrier. Second, to provide a tire carrier that may be readily adjusted to accommodate tires of different diameters. Third, to provide a means whereby the carrier may be adjusted to receive a tire and rim freely, and afterward readily adjusted to clamp the rim firmly in place. Fourth, to provide a means whereby the tire and rim may be securely locked upon the carrier.

Figure 1:
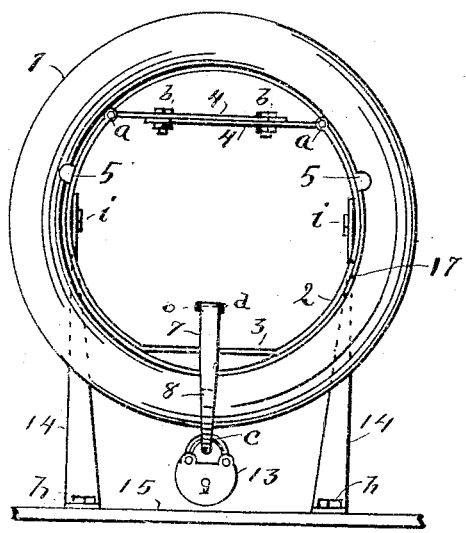
Figure 2:
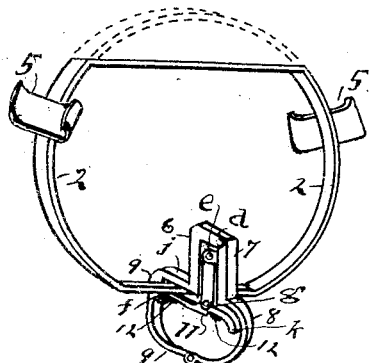
Figure 3:
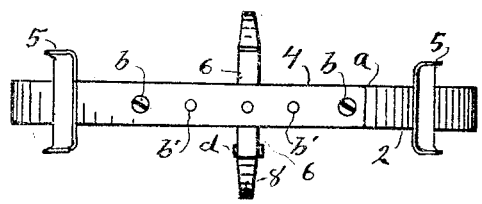
Figure 4:
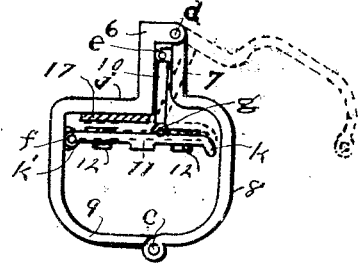
Figure 6:
Figure 7:
Figure 5:
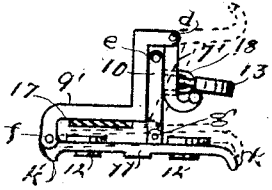

I attain these objects by the mechanism and construction shown in the accompanying drawing, in which Figure 1 is an elevation of this carrier with a tire secured thereon. Fig. 2 is a perspective of the carrier detached from an automobile and with the tire removed to show the relative positions of its several parts. Fig. 3 is a plan of the same. Fig. 4 is an elevation of the adjustable locking clamp with which the tire and rim are secured upon the carrier. Fig. 5 is a modified form of the same. Fig. 6 is a section of a short piece of the adjustable part of the clamp showing the manner of attaching an adjusting pin or pressure bearing, and Fig. 7 is an edge elevation of the securing clamp shown in Fig. 5.

Similar reference characters indicate similar parts throughout the several views.

In the construction of this carrier I make use of thin band iron, steel, or other suitable material, with which I form two segments of a circle, 2, upon opposite sides, connected with a plain integral bar 3, and having connecting bars 4 pivotally connected with the ends, as at $a$. The free ends of these connecting bars are made to extend by each other, as indicated in Figs. 2 and 3, and are so punctured, as at $b'$, that bolts $b$ may be inserted and drawn firmly into place to hold the side segments 2 in the desired positions to accommodate them to the diameter of the tires to be carried thereon. Near the upper ends of the segments I place two arms, 5, which, in the drawings, are shown as of sufficient length to carry two tires side by side, if desired, though they may be made to accommodate but one tire at a time. These arms are, practically, integral with the segments, or, rather, permanently secured thereto.

In connection with the carrier as so far described, I use a standard 6 having a right angled offset $j$, that is securely attached to, or made integral with the bar 3, that connects the segments 2, as in Fig. 2. The offset $j$ is bent and continued to form the arm 9 of the clamp. To the clamp standard 6 I pivotally connect a second standard 7, as at $d$, which latter is continued to form the curved adjustable arm 8 of the clamp. The two arms, 8 and 9, are so constructed at $c$ that a padlock 13 may be connected therewith to lock the ends securely together after the tire has been properly placed, as indicated in Fig. 1.

To complete the clamp I pivot an oscillating arm 11 to the arm 9, as at $f$, so it may be made to move upwardly and downwardly at one end $k$, by means of the connecting link 10, one end of which is pivotally connected with the oscillating arm 11, as at $g$, and the other end of which is pivotally connected with the standard 7, as at $e$, so that if the arm 8 is thrown into the position indicated by its dotted lines in Fig. 4, the oscillating arm 11 will be drawn upwardly, as indicated by its dotted lines, into a position to relieve the tire and enable the operator to readily remove or replace it. When the arm 8 is carried back into normal position arms 8 and 9 will hold and clamp the tire securely in the carrier.

At 12 I have shown spring actuated bearings that are designed to be forced against the inner surface of the rim 17 by means of the spring 16, so they will press sufficiently against the surface of the rim to avert the danger of unpleasant rattling or pounding of the metal rim against the supporting arms of the carrier. These bearings may, or may not be used, as the operator may desire.

In Fig. 5 I have shown a modified form of clamp in which the curved arms 8 and 9 are dispensed with and a modified form of arm, 7', is used instead of the standard 7. The arm 7' is connected with the link 10, and the oscillating arm 11 to operate upon said oscillating arm 11 exactly as the standard 7 acts upon it, as hereinbefore described. In both instances the points $k$ are designed to engage the rim 17, only. The adjustable jaw 7' may be securely locked in place by means of a pad-lock 13, engaging with the staple 18, as indicated in Fig. 5, as shown.

14 represents a form of bracket or standard for supporting the carrier. These brackets are represented as secured to the running board 15, at $h$, and to the carrier sides at $i$, simply as indicative of how they may be made to carry the carrier, or to indicate how any available support may be used for the purpose.

In Fig. 6 I have indicated one means whereby the bearings 12 may be held within their receptacles by the actuating spring 16 without danger of the bearings dropping out of place when the rim of the wheel is removed, thus showing but one, and a very simple means for the purpose.

The cross bars at the upper ends of the sides may, if desired, be made integral with the sides and securely connected or, if desired, made continuous, or the sides may be carried around to form a perfect circle at the top, as indicated by the dotted lines in Fig. 2, but I prefer the pivotal and adjustable connections shown in Figs. 1 and 3, as adjustable to different sizes of tires.

What I claim as new in the art, is:—

1. In a tire carrier, segmental sides connected at the lower ends by an integral bar, cross bars pivotally connected with the upper ends of the segmental side bars and made to lap by each other, bolts for securing said bars together at desired points, tire supporting arms connected with the sides; in combination with a clamp made up of a permanent standard secured to the integral cross bar, a permanent clamping arm made integral with said standard, an adjustable standard pivotally connected with the permanent standard, a clamping arm integral with the adjustable standard, an oscillating supporting arm pivotally connected with the permanent clamping arm, a link pivotally connected with the supporting arm and with the adjustable standard to actuate the supporting arm by the movements of the adjustable standard, and means for locking the clamping arms in place.

2. In a tire carrier, segmental sides connected at the lower ends by an integral bar, cross bars pivotally connected with the upper ends of the segmental sides and made to lap by each other, bolts for securing said bars together at desired points, and tire supporting arms connected with the sides and with the bottom cross bar; in combination with a clamping device having a permanent standard and an integral arm connected therewith, said standard and arm securely mounted upon the cross bar of the carrier, an adjustable standard pivotally connected with the permanent standard, a supporting arm pivotally connected with the base of the permanent standard, a link connecting the supporting arm with the adjustable standard, and means for locking the adjustable standard so it cannot be moved upon its pivotal bearings.

3. In a tire carrier, segmental sides connected at their lower ends with an integral bar, cross bars pivotally connected with the upper ends of the sides and lapped by each other, means for securing said bars together at desired points, supporting arms connected with the sides, a standard mounted upon the lower cross bar, a stationary arm integral with and extending below the standard, an adjustable arm pivotally mounted on the standard, an oscillating arm pivotally connected with the stationary arm and also with the adjustable arm, spring actuated pressure bearings in the oscillating arm and means for locking the adjustable arm and the oscillating arm firmly in place.

Signed at Grand Rapids, Michigan, December 4, 1918.

ALBERT P. CRELL.